(12) United States Patent
Gu et al.

(10) Patent No.: US 11,170,022 B1
(45) Date of Patent: Nov. 9, 2021

(54) METHOD AND DEVICE FOR PROCESSING MULTI-SOURCE HETEROGENEOUS DATA

(71) Applicant: Shanghai IceKredit, Inc., Shanghai (CN)

(72) Inventors: Lingyun Gu, Shanghai (CN); Zhipan Guo, Shanghai (CN); Kai Wang, Shanghai (CN); Xuan Wang, Shanghai (CN)

(73) Assignee: Shanghai IceKredit, Inc., Shanghai (CN)

( * ) Notice: Subject to any disclaimer, the term of this patent is extended or adjusted under 35 U.S.C. 154(b) by 0 days.

(21) Appl. No.: 17/228,987

(22) Filed: Apr. 13, 2021

(30) Foreign Application Priority Data

Jun. 3, 2020 (CN) .......................... 202010492097.8

(51) Int. Cl.
*G06F 16/25* (2019.01)
*G06F 16/215* (2019.01)
*G06F 16/28* (2019.01)

(52) U.S. Cl.
CPC .......... *G06F 16/258* (2019.01); *G06F 16/215* (2019.01); *G06F 16/254* (2019.01); *G06F 16/283* (2019.01)

(58) Field of Classification Search
CPC .... G06F 16/258; G06F 16/283; G06F 16/254; G06F 16/215
See application file for complete search history.

(56) References Cited

U.S. PATENT DOCUMENTS

2014/0156591 A1    6/2014   Sukumar et al.

FOREIGN PATENT DOCUMENTS

CN     109299183 A    2/2019

OTHER PUBLICATIONS

First Office Action in counterpart Chinese Patent Application No. 202010492097.8, dated Jul. 16, 2020.
Ni, Design and Realization of Visualization System of Agricultural Statistical Data, Chinese Master's Theses Full-text Database Agricultural Science and Technology Series, Mar. 15, 2019, vol. 3, pp. 13-23.
Zhang et al., Incomplete Relation Revision Method Based on Template, The 2017 4th International Conference on Systems and Informatics (ICSAI 2017), 2017, pp. 1563-1567.

*Primary Examiner* — Charles D Adams
(74) *Attorney, Agent, or Firm* — Westbridge IP LLC

(57) ABSTRACT

Disclosed are a method and a device for processing multi-source heterogeneous data. The data source to be processed of multi-source heterogeneous data and the field data of the field to be converted under each data source to be processed are determined, then the target standard attribute field of the field to be converted under each data source to be processed in the target data dimension is determined from a pre-configured conversion field library. Then, the fields to be converted under each data source to be processed are converted into corresponding target standard attribute fields, to obtain the field data of the target standard attribute field under each data source to be processed, thereby synthesizing the multi-source heterogeneous standard data of the target data dimension.

5 Claims, 4 Drawing Sheets

METHOD AND DEVICE FOR PROCESSING MULTI-SOURCE HETEROGENEOUS DATA

CROSS-REFERENCE TO RELATED APPLICATIONS

This application claims priority to Chinese Application No. 202010492097.8, filed on Jun. 3, 2020, the entire disclosure of which is incorporated herein by reference.

TECHNICAL FIELD

The present disclosure relates to the technical field of data processing, in particular to a method and a device for processing multi-source heterogeneous data.

BACKGROUND

Nowadays, existing enterprise-related data is usually provided by enterprise data providers of various data sources. For example, it can include multiple data dimensions such as industry and commerce, intangible assets, justice, and administrative negatives. Generally, each data field of each data dimension is defined by the enterprise data provider of each data source. However, inventors of the present disclosure found that the data fields defined by different data source manufacturers are not the same, which makes it difficult to use the field data in data aggregation, and the field data is also incomplete.

SUMMARY

In view of this, the objective of the present disclosure is to provide a method and a device for processing multi-source heterogeneous data, which aims to abstract the field data of the fields to be converted provided by different data sources into unified multi-source heterogeneous standard data, improve the experience of using field data in data aggregation, and improve the integrity of field data.

According to a first aspect of the present disclosure, a method for processing multi-source heterogeneous data is provided, which is applied to a server communicating with a user terminal, and the method includes:

obtaining multi-source heterogeneous data of a target data dimension, and determining data source to be processed of the multi-source heterogeneous data and field data of field to be converted under each data source to be processed;

determining a target standard attribute field of the field to be converted under each data source to be processed in the target data dimension from a pre-configured conversion field library, the pre-configured conversion field library including convertible fields corresponding to standard attribute fields of different data dimensions for each preset data source;

converting the field to be converted under each data source to be processed into a corresponding target standard attribute field to obtain the field data of the target standard attribute field under each data source to be processed; and synthesizing the multi-source heterogeneous standard data of the target data dimension according to the field data of the target standard attribute field under each data source to be processed.

In a possible implementation manner of the first aspect, the method further includes the operation of configuring a convertible field of each preset data source under standard attribute fields of different data dimensions, which specifically includes:

obtaining data dimensions to be standardized and data fields of different preset data sources under each data dimension to be standardized;

obtaining a valid field content corresponding to each data dimension to be standardized, and determining a standard attribute field under each data dimension to be standardized, and determining the convertible field of each preset data source under the standard attribute field according to a semantic analysis result of the standard attribute field; and establishing the convertible field of each data source under the standard attribute fields corresponding to different data dimensions.

In a possible implementation manner of the first aspect, the operation of determining the convertible field of each preset data source under the standard attribute field according to a semantic analysis result of the standard attribute field includes:

obtaining the semantic analysis result of the standard attribute field, and searching for a matching field sequence in an online public database matching the semantic analysis result; and determining the convertible field of each preset data source under the standard attribute field from a selection operation instruction for the matching field sequence.

In a possible implementation manner of the first aspect, the operation of synthesizing the multi-source heterogeneous standard data of the target data dimension according to the field data of the target standard attribute field under each data source to be processed includes:

performing a first deduplication process on the field data of the target standard attribute field under the data source to be processed according to a preset deduplication field corresponding to the target data dimension for each data source to be processed, to obtain the field data of the target standard attribute field after deduplication of the data source to be processed;

performing a second deduplication process on the field data of the target standard attribute field after deduplication of each data source to be processed, and combining the field data after the second deduplication process to obtain the multi-source heterogeneous standard data of the target data dimension.

In a possible implementation manner of the first aspect, the operation of performing a first deduplication process on the field data of the target standard attribute field under the data source to be processed according to a preset deduplication field corresponding to the target data dimension to obtain the field data of the target standard attribute field after deduplication of the data source to be processed includes:

obtaining search key field of the target data dimension as a preset deduplication field corresponding to the target data dimension when the target data dimension is a single data dimension; and searching for a target field data matching the preset deduplication field under the data source to be processed, and excluding all duplicate target field data, to obtain the field data of the target standard attribute field after deduplication of the data source to be processed.

In a possible implementation manner of the first aspect, the operation of performing a first deduplication process on the field data of the target standard attribute field under the data source to be processed according to a preset deduplication field corresponding to the target data dimension to obtain the field data of the target standard attribute field after deduplication of the data source to be processed includes:

analyzing data business meaning of the target data dimension, and determining key business field of the target data dimension as a preset deduplication field corresponding to the target data dimension, when the target data dimension is a list data dimension;

searching for a target field data matching the preset deduplication field under the data source to be processed, and excluding all duplicate target field data, to obtain the field data of the target standard attribute field after deduplication of the data source to be processed;

when there are multiple key business fields in the target data dimension, and there are some empty target key business fields, obtaining supplementary deduplication fields corresponding to the empty target key business fields from a pre-configured supplementary field library, and using the supplementary deduplication fields and remaining key business fields as the preset deduplication field, the pre-configured supplementary field library including supplementary deduplication fields corresponding to each key business field.

In a possible implementation manner of the first aspect, the operation of performing a second deduplication process on the field data of the target standard attribute field after deduplication of each data source to be processed, and combining the field data after the second deduplication process to obtain the multi-source heterogeneous standard data of the target data dimension includes:

obtaining a priority of each data source to be processed, and using a basic data source with a highest priority as a basis, searching whether all standard attribute fields of the target data dimension exist in the target standard attribute field under the basic data source;

determining the field data of the target standard attribute field under the basic data source as the multi-source heterogeneous standard data of the target data dimension when all standard attribute fields of the target data dimension exist in the target standard attribute field under the basic data source;

obtaining filled standard attribute fields that do not exist in all standard attribute fields of the target data dimension when at least part of the standard attribute fields of the target data dimension does not exist in the target standard attribute field under the basic data source;

obtaining field data to be filled after searching for at least one iteration cycle based on the filled standard attribute fields, and filling the field data to be filled into the basic data source, and combining to obtain the multi-source heterogeneous standard data of the target data dimension;

after each iteration cycle, searching for the target standard attribute field under the supplementary data source of next priority whether at least part of the standard attribute field obtained in a previous iteration cycle is filled in, when there are all filled standard attribute fields in the target standard attribute field under the supplementary data source of the iteration cycle, using the field data of the filled standard attribute fields under the supplementary data source of the iteration cycle as the field data to be filled, and ending the iteration cycle; and when there are only partially filled standard attribute fields in the target standard attribute field under the supplementary data source of the iteration cycle, using the field data of the partially filled standard attribute fields under the supplementary data source of the iteration cycle as the field data to be filled, and continuing to execute next iteration cycle; and when the filled target standard attribute fields do not exist in the target standard attribute field under the supplementary data source of the iteration cycle, continuing to execute the next iteration cycle, ending the iterative cycle, and obtaining the field data of all filled standard attribute fields as the field data to be filled after iteratively searching for the target standard attribute fields under all the data sources to be processed.

According to a second aspect of the present disclosure, a device for processing multi-source heterogeneous data is provided, which is applied to a server communicating with a user terminal, and the device includes:

an acquisition module for obtaining multi-source heterogeneous data of a target data dimension, and determining data source to be processed of the multi-source heterogeneous data and field data of field to be converted under each data source to be processed;

a determination module for determining a target standard attribute field of the field to be converted under each data source to be processed in the target data dimension from a pre-configured conversion field library, the pre-configured conversion field library including convertible fields corresponding to standard attribute fields of different data dimensions for each preset data source;

a conversion module for converting the field to be converted under each data source to be processed into a corresponding target standard attribute field to obtain the field data of the target standard attribute field under each data source to be processed; and a synthesis module for synthesizing the multi-source heterogeneous standard data of the target data dimension according to the field data of the target standard attribute field under each data source to be processed.

Based on any of the above aspects, in the present disclosure, the data source to be processed of multi-source heterogeneous data and the field data of the field to be converted under each data source to be processed are determined, then the target standard attribute field of the field to be converted under each data source to be processed in the target data dimension is determined from a pre-configured conversion field library. Then, the fields to be converted under each data source to be processed are converted into corresponding target standard attribute fields, to obtain the field data of the target standard attribute field under each data source to be processed, thereby synthesizing the multi-source heterogeneous standard data of the target data dimension. As such, the field data of the fields to be converted provided by different data sources can be abstracted into unified multi-source heterogeneous standard data, which improves the experience of using the field data during data aggregation, and improves the integrity of the field data.

BRIEF DESCRIPTION OF THE DRAWINGS

In order to explain the technical solutions of the embodiments of the present disclosure more clearly, the following will briefly introduce the drawings that need to be used in the embodiments. It should be understood that the following drawings only show some embodiments of the present disclosure, and therefore should not be regarded as limiting the scope. Those of ordinary skill in the art can obtain other related drawings according to these drawings without creative work.

DETAILED DESCRIPTION OF THE EMBODIMENTS

Figure 1:
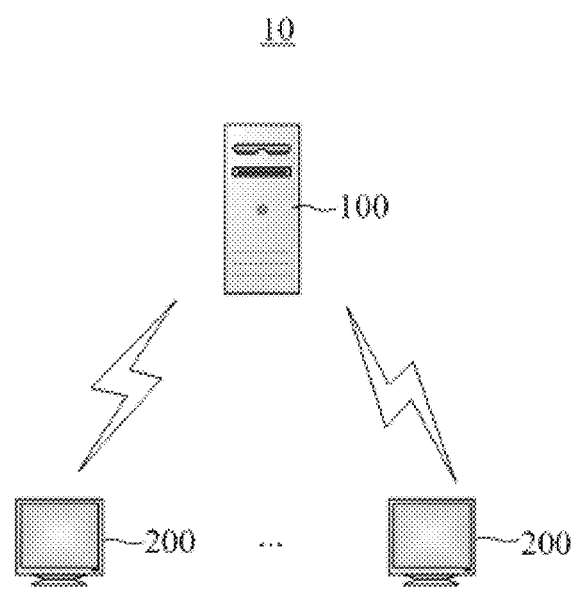
FIG. 1 shows a schematic diagram of an application scenario of a multi-source heterogeneous data processing system according to an embodiment of the present disclosure.

In order to make the purpose, technical solutions, and advantages of the embodiments of the present disclosure clearer, the technical solutions in the embodiments of the present application will be described clearly and completely in conjunction with the drawings in the embodiments of the present disclosure. It should be understood that the drawings in the present disclosure are only for the purpose of illustration and description, and are not intended to limit the scope of the present disclosure. In addition, it should be understood that the schematic drawings are not drawn to scale. The flowchart used in the present disclosure shows operations implemented according to some embodiments of the present disclosure. It should be understood that the operations of the flowchart may be implemented out of order, and operations without logical context may be reversed in order or implemented at the same time. In addition, under the guidance of the content of the present disclosure, those skilled in the art can add one or more other operations to the flowchart, or remove one or more operations from the flowchart.

In addition, the described embodiments are only a part of the embodiments of the present disclosure, rather than all the embodiments. The components of the embodiments of the present disclosure generally described and shown in the drawings herein may be arranged and designed in various different configurations. Therefore, the following detailed description of the embodiments of the present disclosure provided in the accompanying drawings is not intended to limit the scope of the present disclosure, but merely represents selected embodiments of the present disclosure. Based on the embodiments of the present disclosure, all other embodiments obtained by those skilled in the art without creative work shall fall within the scope of the present disclosure.

FIG. 1 shows a schematic diagram of an application scenario of a multi-source heterogeneous data processing system 10 according to an embodiment of the present disclosure. In this embodiment, the multi-source heterogeneous data processing system 10 may include a server 100 and a user terminal 200 communicating with the server 100.

The user terminal 200 may include, but is not limited to, a smart phone, a tablet computer, a laptop computer, a personal computer, a workstation, etc., which is not limited in detail herein.

In a possible implementation manner, the server 100 may be a single server or a server group. The server group may be centralized or distributed (for example, the server 100 may be a distributed system).

It can be understood that in other possible implementation manners, the multi-source heterogeneous data processing system 10 may also include only a part of the components shown in FIG. 1 or may also include other components.

Figure 2:
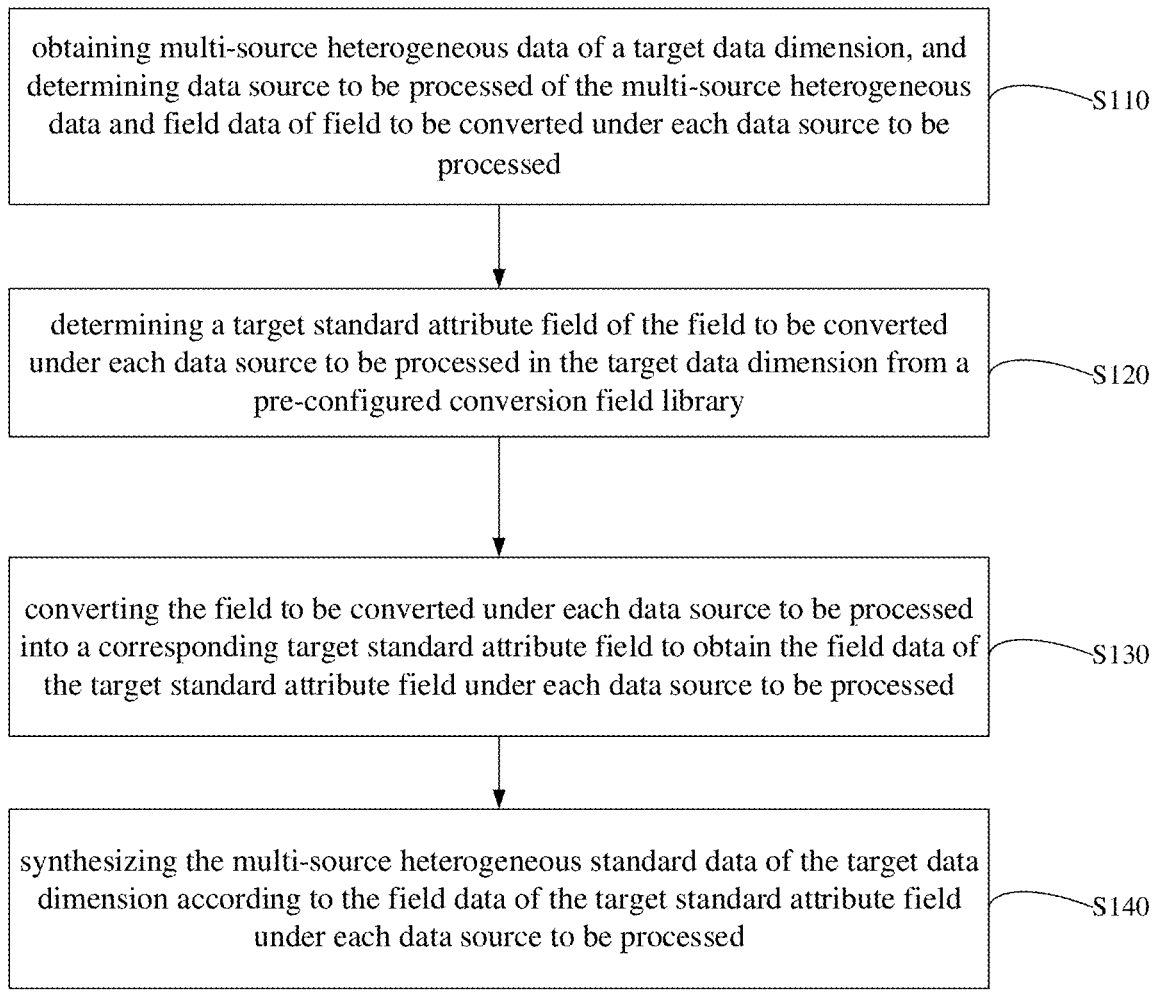
FIG. 2 shows a schematic flowchart of a multi-source heterogeneous data processing method according to an embodiment of the present disclosure.

FIG. 2 shows a schematic flowchart of a method for processing multi-source heterogeneous data according to an embodiment of the present disclosure. In this embodiment, the method for processing the multi-source heterogeneous data may be executed by the server 100 shown in FIG. 1. It should be understood that, in other embodiments, the order of some of the operations of the method for processing the multi-source heterogeneous data may be exchanged according to actual needs, or some of the operations may also be omitted or deleted. The detailed operations of the method for processing the multi-source heterogeneous data are introduced as follows.

Operation S110, obtaining multi-source heterogeneous data of a target data dimension, and determining data source to be processed of the multi-source heterogeneous data and field data of field to be converted under each data source to be processed.

Operation S120, determining a target standard attribute field of the field to be converted under each data source to be processed in the target data dimension from a pre-configured conversion field library.

Operation S130, converting the field to be converted under each data source to be processed into a corresponding target standard attribute field to obtain the field data of the target standard attribute field under each data source to be processed.

Operation S140, synthesizing the multi-source heterogeneous standard data of the target data dimension according to the field data of the target standard attribute field under each data source to be processed.

In this embodiment, the target data dimension can be selected according to the actual needs of users. Taking enterprise-related data as an example, the target data dimension can be but not limited to dimension data such as basic business information, shareholder information, key personnel, branch, individual foreign investment, liquidation information, change information, chattel mortgage, equity pledge, administrative penalty, business abnormality, enterprise foreign investment, enterprise legal person foreign investment, enterprise legal person foreign employment, corporate legal person serve as foreign legal person, judicial auction, serious violation of laws, trademark, patent, software copyright, work copyright, website, certificate, recruitment information, administrative permit, random inspection, court announcement, judgment document, case procedure, court announcement, the person subject to enforcement, the person who is untrustworthy, judicial assistance, tax arrears announcement, tax-related penalty, abnormal taxpayer, tax credit rating, food and drug supervision, quality supervision, environmental penalty, environmental protection key monitoring, administrative blacklist, central bank supervision, customs enterprise, customs permit, customs credit rating, and customs penalty. Under the target data dimension, relevant multi-source heterogeneous data can be collected, and the data source to be processed of the multi-source heterogeneous data and the field data of the field to be converted under each data source to be processed can be determined.

In this embodiment, the data source to be processed may refer to a data source provider for providing field data related to the target data dimension, such as Qichacha data source, Qixinbao data source, etc., which are not specifically limited herein.

In this embodiment, the pre-configured conversion field library may include convertible fields of each preset data source under standard attribute fields of different data dimensions. For example, it may include the convertible fields of the Qichacha data source and the Qixinbao data source in the above example under the standard attribute fields in the basic business information dimension and the court announcement dimension.

Therefore, the field to be converted under each data source to be processed can be converted into the corresponding target standard attribute field, and the field data of the target standard attribute field under each data source to be processed can be obtained. Then the multi-source heterogeneous standard data of the target data dimension can be synthesized according to the field data of the target standard attribute field under each data source to be processed. Thereby, the field data of the field to be converted provided by different data sources can be abstracted into a unified multi-source heterogeneous standard data, which improves the experience of using the field data in data aggregation, and improves the integrity of the field data.

In a possible implementation, the process of configuring the corresponding convertible fields of each preset data source under the standard attribute fields of different data dimensions will be exemplified below. The configuration process can be implemented through the following implementation manners, which are described in detail as follows.

(1) Obtaining data dimensions to be standardized and data fields of different preset data sources under each data dimension to be standardized.

(2) Obtaining a valid field content corresponding to each data dimension to be standardized, and determining the standard attribute field under each data dimension to be standardized, and determining the convertible field of each preset data source under the standard attribute field according to a semantic analysis result of the standard attribute field.

(3) Establishing the convertible field of each data source under the standard attribute fields corresponding to different data dimensions.

For example, the convertible fields corresponding to each data source (data source 1 and data source 2) under the standard attribute field of a data dimension to be standardized can be as follows.

| | | Data source 1 | | Data source 2 | |
|---|---|---|---|---|---|
| Standard attribute field name | English name | Convertible field name | Field Type | Convertible field name | Field Type |
| Standard attribute field 1 | English name 1 | Convertible field 1 | Type A | Convertible field 4 | Type A |
| Standard attribute field 2 | English name 2 | Convertible field 2 | Type A | Convertible field 5 | Type A |
| Standard attribute field 3 | English name 3 | Convertible field 3 | Type A | Convertible field 6 | Type A |

Thus, in operation S120 and operation S130, for the field data of the convertible field 1, the convertible field 2, the convertible field 3 under the data source 1, the standard attribute field 1, standard attribute field 2, and standard attribute field 3 corresponding to the convertible field 1, the convertible field 2, and the convertible field 3 can be searched. Then, the convertible field 1, convertible field 2, and convertible field 3 are converted into standard attribute field 1, standard attribute field 2, and standard attribute field 3, and the original field data of convertible field 1, convertible field 2, and convertible field 3 are retained.

Similarly, for the field data of the convertible field 4, the convertible field 5, the convertible field 6 under the data source 2, the standard attribute field 1, standard attribute field 2, and standard attribute field 3 corresponding to the convertible field 4, the convertible field 5, and the convertible field 6 can be searched. Then, the convertible field 4, convertible field 5, and convertible field 6 are converted into standard attribute field 1, standard attribute field 2, and standard attribute field 3, and the original field data of convertible field 4, convertible field 5, and convertible field 6 are retained.

In a possible implementation manner, during the process of the above operation (2), in order to improve the configuration efficiency of the convertible field, in this embodiment, the semantic analysis result of the standard attribute field can be obtained (for example, the semantic analysis result can be obtained through the semantic analysis of machine recognition), and the matching field sequence matching the semantic analysis result in the online public database can be searched. Then, the convertible field corresponding to each preset data source under the standard attribute field is determined from the selection operation instruction for the matching field sequence.

For example, users can customize the relevant convertible fields based on the semantic analysis result of standard attribute fields, and can also automatically search the matching field sequence in the online public database that matches the semantic analysis result, and then select a convertible field that more matches the semantics of the standard attribute field from the matching field sequence according to the semantic analysis result.

In a possible implementation manner, for operation S140, through research, the inventors of the present disclosure have discovered that since the field data is in different data sources, a large amount of duplicate data may appear during the process of synthesizing the multi-source heterogeneous standard data of the target data dimension, which affects the subsequent use experience of the field data. Based on this, further deduplication operations are required. Operation S140 can be further implemented by the following sub-operation S141 and sub-operation S142, which are exemplarily described as follows.

Sub-operation S141, performing a first deduplication process on the field data of the target standard attribute field under the data source to be processed according to a preset deduplication field corresponding to the target data dimension for each data source to be processed, to obtain the field data of the target standard attribute field after deduplication of the data source to be processed.

Sub-operation S142, performing a second deduplication process on the field data of the target standard attribute field after deduplication of each data source to be processed, and combining the field data after the second deduplication process to obtain the multi-source heterogeneous standard data of the target data dimension.

In this embodiment, different data dimensions need to be classified in advance, for example, they can be divided into single data dimensions and list data dimensions. Taking the basic business information dimension and the court announcement dimension as examples, there is usually only one basic business information for a company, but the company may have multiple judicial disputes and multiple court announcements. Therefore, the basic business information dimension can be understood as a single data dimension, and the court announcement dimension can be understood as a list data dimension.

For example, in sub-operation S141, when the target data dimension is a single data dimension, the search key field of the target data dimension may be obtained as the preset deduplication field corresponding to the target data dimension. For example, for the basic business information dimension, the search key field is the company name. That is to say, based on the user's search habits, when searching for the basic business information of a company, the company name field is usually used as the search key field. However, the user does not want to have a large number of duplicate field data of the company name field in the search results, so the company name field needs to be used as the preset deduplication field corresponding to the basic business information dimension.

On this basis, a target field data matching the preset deduplication field under the data source to be processed can be searched, and all duplicate target field data can be excluded, to obtain the field data of the target standard attribute field after deduplication of the data source to be processed.

For example, the target field data that matches the company name field under the data source to be processed can be searched, and all duplicate target field data can be excluded, to obtain the field data of the target standard attribute field after deduplication of the data source to be processed.

For another example, in sub-operation S141, when the target data dimension is a list data dimension, the data business meaning of the target data dimension can be analyzed, and the key business fields of the target data dimension can be determined as the preset deduplication field corresponding to the target data dimension.

In this embodiment, for the list data dimension, since there may be multiple pieces of related information, more than one search key field may be required when the user searches. Therefore, it is necessary to set the preset deduplication field according to the field of the specific business meaning of the list data dimension. For example, taking the hearing announcement data dimension as an example, the preset deduplication field can usually be the court field, the court time field, and the party field. In other words, when the court field, the court time field, and the party field are determined, the unique field data can be determined. Or, when some of the fields are determined, the unique field data can be determined. If the court time field is exactly the same as that of the parties, the data for a hearing announcement can be uniquely determined.

In addition, the data format under the court field, court time field, and party field in the above example also needs to be unified. For example, the court time field can adopt the rules of YYYY year MM month DD day, the party field can be sorted in dictionary order, and the court can also adopt a unified naming rule. For example, the Intermediate People's Court of Province A and City of B and the Intermediate People's Court of City B are actually the same court and should be named uniformly.

On this basis, the target field data matching the preset deduplication field under the data source to be processed can be searched, and all duplicate target field data can be excluded, to obtain the field data of the target standard attribute field after deduplication of the data source to be processed.

For example, still taking the above example as an example, the target field data of the court field, the court time field and the party field under the data source to be processed can be searched, and all the duplicate target field data in the target field data of the court field, the court time field and the party field can be excluded, to obtain the field data of the target standard attribute field after deduplication of the data source to be processed.

When there are multiple key business fields in the above target data dimension, and some target key business fields are empty, in order to ensure the deduplication effect, in this embodiment, it is also possible to obtain the supplementary deduplication fields corresponding to part of the target key business fields from a pre-configured supplementary field library, and use the supplementary deduplication fields and the remaining key business fields as the preset deduplication fields. The pre-configured supplementary field library includes supplementary deduplication fields corresponding to each key business field.

For example, when the court field is empty and only the court time field and the party field exist in the preset data source, the supplementary deduplication fields for the court field may be the cause field and the case number field. In other words, when the court field is empty, you can still perform the above deduplication operation by replacing the court field with the supplementary cause field and case number field.

On the basis of the above description, next, it is necessary to perform a second deduplication process on the field data of the target standard attribute field after the above data source to be processed is deduplicated to ensure that there is no redundant field data under different preset data sources during the synthesis process. In a possible implementation manner, the sub-operation S142 can be implemented in the following exemplary implementation manner, which is specifically described as follows.

(1) Obtaining a priority of each data source to be processed, and using a basic data source with a highest priority as a basis, searching whether all standard attribute fields of the target data dimension exist in the target standard attribute field under the basic data source.

In this embodiment, the priority of each data source to be processed can be configured in advance, and then each data source to be processed can be sorted according to the priority. For example, assuming that there are three data sources to be processed, and the result of sorting according to priority can be data source 1 to be processed, data source 2 to be processed, data source 3 to be processed, then data source 1 to be processed has the highest priority. Therefore, the data source 1 to be processed can be used as the basic data source. At this time, it can be found whether all the standard attribute fields of the target data dimension exist in the target standard attribute fields under the data source 1 to be processed.

For example, assuming that all standard attribute fields of the target data dimension include standard attribute field 1, standard attribute field 2, standard attribute field 3, standard attribute field 4, and standard attribute field 5, at this time, it can be found whether there are standard attribute field 1, standard attribute field 2, standard attribute field 3, standard attribute field 4, and standard attribute field 5 in the target standard attribute field under the data source 1 to be processed.

(2) Determining the field data of the target standard attribute field under the basic data source as the multi-source heterogeneous standard data of the target data dimension when all standard attribute fields of the target data dimension exist in the target standard attribute field under the basic data source.

Taking the above example as an example, when there are standard attribute field 1, standard attribute field 2, standard attribute field 3, standard attribute field 4, and standard attribute field 5 in the target standard attribute field under the data source 1 to be processed, the field data of the standard attribute field 1, the standard attribute field 2, the standard attribute field 3, the standard attribute field 4, and the standard attribute field 5 under the data source 1 to be processed is determined as the multi-source heterogeneous standard data of the target data dimension.

(3) Obtaining filled standard attribute fields that do not exist in all standard attribute fields of the target data dimension when at least part of the standard attribute fields of the target data dimension does not exist in the target standard attribute field under the basic data source.

Still taking the above example as an example, when some standard attributes in the standard attribute field 1, the standard attribute field 2, the standard attribute field 3, the standard attribute field 4, and standard attribute field 5 exist in the target standard attribute field of data source 1 to be processed, the filled standard attribute fields that do not exist in the standard attribute field 1, the standard attribute field 2, the standard attribute field 3, the standard attribute field 4, and the standard attribute field 5 can be obtained.

(4) Obtaining field data to be filled after searching for at least one iteration cycle based on the filled standard attribute fields, and filling the field data to be filled into the basic data source, and combining to obtain the multi-source heterogeneous standard data of the target data dimension.

After each iteration cycle, look up whether the target standard attribute field under the supplementary data source of the next priority has at least partially filled standard attribute fields obtained in the previous iteration cycle. When there are all filled standard attribute fields in the target standard attribute fields under the supplementary data source of this iteration cycle, the field data of the filled standard attribute field under the supplementary data source of the iteration cycle is used as the field data to be filled, and the iteration cycle is ended.

For example, assuming that the filled standard attribute fields that do not exist in standard attribute field 1, standard attribute field 2, standard attribute field 3, standard attribute field 4, and standard attribute field 5 are standard attribute field 1 and standard attribute field 2, then the supplementary data source of the next priority can be searched, that is, whether there are standard attribute field 1 and standard attribute field 2 in the target standard attribute field under the data source 2 to be processed. When there are standard attribute field 1 and standard attribute field 2 in the target standard attribute field under the data source 2 to be processed, the field data of the standard attribute field 1 and the standard attribute field 2 under the data source 2 to be processed are used as the field data to be filled, and the iteration cycle is ended. Thus, the field data of the standard attribute field 1 and the standard attribute field 2 under the data source 2 to be processed can be filled into the data source 1 to be processed, and the multi-source heterogeneous standard data of the target data dimension can be combined.

Or, when there are only partially filled standard attribute fields in the target standard attribute field under the supplementary data source of this iteration cycle, the partially filled standard attribute field under the supplementary data source of the iteration cycle is used as the field data to be filled, and the next iteration cycle is continued.

For example, assuming that only the standard attribute field 1 exists in the target standard attribute field under the data source 2 to be processed, the field data of the standard attribute field 1 under the data source 2 to be processed can be used as the field data to be filled, and the iteration cycle is continued. For example, you can further find out whether the target standard attribute field under the data source 3 to be processed includes the standard attribute field 2. When the target standard attribute field under the data source 3 to be processed includes the standard attribute field 2, the field data of the standard attribute field 2 under the data source 3 to be processed can be used as the field data to be filled, thereby ending the iteration cycle. Thus, the field data of the standard attribute field 1 under the data source 2 to be processed and the field data of the standard attribute field 2 under the data source 3 to be processed can be filled under the data source 1 to be processed, combine to obtain multi-source heterogeneous standard data of the target data dimension.

For another example, when there is no filled standard attribute field in the target standard attribute field under the supplementary data source of the iteration cycle, continue to execute the next iteration cycle. After iteratively searching the target standard attribute fields under all the data sources to be processed, the iterative cycle is ended, and the field data of all filled standard attribute fields found are obtained as the field data to be filled.

For example, still taking the above example as an example, assuming that there is no standard attribute field 1 and standard attribute field 2 in the target standard attribute field under the data source 2 to be processed, then continue to find whether there are standard attribute field 1 and standard attribute field 2 in the target standard attribute field under the data source 2 to be processed, and then continue to refer to the above process for judgment. If you iteratively search for the target standard attribute fields under all the data sources to be processed (for example, the data source 1 to be processed, the data source 2 to be processed, and the data source 3 to be processed), the iterative cycle is ended, and the field data of all filled standard attribute fields found are obtained as the field data to be filled.

Figure 3:
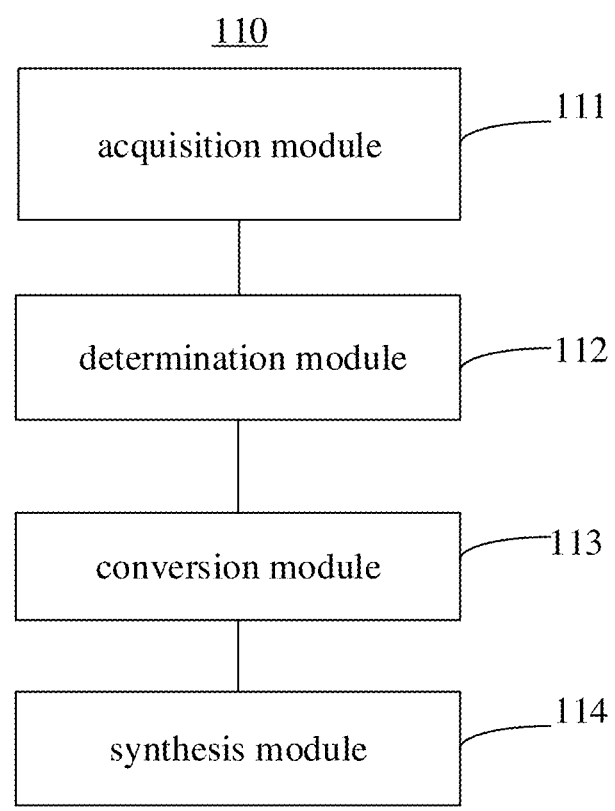
FIG. 3 shows a schematic diagram of functional modules of a multi-source heterogeneous data processing device according to an embodiment of the present disclosure.

Based on the same inventive concept, please refer to FIG. 3, which shows a schematic diagram of functional modules of a multi-source heterogeneous data processing device 110 according to an embodiment of the present disclosure. In this embodiment, the multi-source heterogeneous data processing device 110 can be divided into functional modules according to the foregoing method embodiment. For example, each function module can be divided according to each function, or two or more functions can be integrated into one processing module. The above-mentioned integrated modules can be implemented in the form of hardware or software functional modules. It should be noted that the division of modules in the embodiments of the present disclosure is illustrative, and is only a logical function division, and there may be other division methods in actual implementation. For example, in the case of dividing each functional module corresponding to each function, the multi-source heterogeneous data processing device 110 shown in FIG. 3 is only a schematic diagram of the device. The multi-source heterogeneous data processing device 110 may include an acquisition module 111, a determination module 112, a conversion module 113, and a synthesis module 114. The functions of each functional module of the multi-source heterogeneous data processing device 110 are respectively described in detail below.

The acquisition module 111 is for obtaining multi-source heterogeneous data of a target data dimension, and determining data source to be processed of the multi-source heterogeneous data and field data of field to be converted under each data source to be processed. It can be understood that the acquisition module 111 may be used to perform the above operation S110. The detailed implementation of the acquisition module 111 may refer to the above-mentioned content related to operation S110.

The determination module 112 is for determining a target standard attribute field of the field to be converted under each data source to be processed in the target data dimension from a pre-configured conversion field library, the pre-configured conversion field library including convertible fields corresponding to standard attribute fields of different data dimensions for each preset data source. It can be understood that the determination module 112 may be used to perform the above operation S120. The detailed implementation of the determination module 112 may refer to the above-mentioned content related to the operation S120.

The conversion module 113 is for converting the field to be converted under each data source to be processed into a corresponding target standard attribute field to obtain the field data of the target standard attribute field under each data source to be processed. It can be understood that the conversion module 113 may be used to perform the above operation S130. The detailed implementation of the conversion module 113 may refer to the above-mentioned content related to the operation S130.

The synthesis module 114 is for synthesizing the multi-source heterogeneous standard data of the target data dimension according to the field data of the target standard attribute field under each data source to be processed. It can be understood that the synthesis module 114 may be used to perform the above operation S140. The detailed implementation of the synthesis module 114 may refer to the above-mentioned content related to the operation S140.

In a possible implementation manner, the multi-source heterogeneous data processing device 110 may further include a configuration module. The configuration module is for configuring a convertible field of each preset data source under standard attribute fields of different data dimensions, for example, obtaining data dimensions to be standardized and data fields of different preset data sources under each data dimension to be standardized; then obtaining a valid field content corresponding to each data dimension to be standardized, and determining the standard attribute field under each data dimension to be standardized, and determining the convertible field of each preset data source under the standard attribute field according to a semantic analysis result of the standard attribute field; and establishing the convertible field of each data source under the standard attribute fields corresponding to different data dimensions.

In a possible implementation manner, the configuration module can determine the corresponding convertible fields of each preset data source under the standard attribute fields in the following manner:

obtaining the semantic analysis result of the standard attribute field, and searching for a matching field sequence in an online public database matching the semantic analysis result; and determining the convertible field of each preset data source under the standard attribute field from a selection operation instruction for the matching field sequence.

In a possible implementation manner, the synthesis module 114 may synthesize the multi-source heterogeneous standard data of the target data dimension in the following manner:

performing a first deduplication process on the field data of the target standard attribute field under the data source to be processed according to a preset deduplication field corresponding to the target data dimension for each data source to be processed, to obtain the field data of the target standard attribute field after deduplication of the data source to be processed;

performing a second deduplication process on the field data of the target standard attribute field after deduplication of each data source to be processed, and combining the field data after the second deduplication process to obtain the multi-source heterogeneous standard data of the target data dimension.

In a possible implementation manner, the synthesis module 114 may perform the first deduplication process on the field data of the target standard attribute field under the data source to be processed to obtain the field data of the target standard attribute field after deduplication of the data source to be processed in the following manner:

obtaining search key field of the target data dimension as a preset deduplication field corresponding to the target data dimension when the target data dimension is a single data dimension; and searching for a target field data matching the preset deduplication field under the data source to be processed, and excluding all duplicate target field data, to obtain the field data of the target standard attribute field after deduplication of the data source to be processed.

In a possible implementation manner, the synthesis module 114 may perform the first deduplication process on the field data of the target standard attribute field under the data source to be processed to obtain the field data of the target standard attribute field after deduplication of the data source to be processed in the following manner:

analyzing data business meaning of the target data dimension, and determining key business field of the target data dimension as a preset deduplication field corresponding to the target data dimension, when the target data dimension is a list data dimension;

searching for a target field data matching the preset deduplication field under the data source to be processed, and excluding all duplicate target field data, to obtain the field data of the target standard attribute field after deduplication of the data source to be processed;

when there are multiple key business fields in the target data dimension, and there are some empty target key business fields, obtaining supplementary deduplication fields corresponding to the empty target key business fields from a pre-configured supplementary field library, and using the supplementary deduplication fields and remaining key business fields as the preset deduplication field, the pre-configured supplementary field library including supplementary deduplication fields corresponding to each key business field.

In a possible implementation manner, the synthesis module 114 may perform a second deduplication process on the field data of the target standard attribute field after deduplication of each data source to be processed, and combining the field data after the second deduplication process to obtain the multi-source heterogeneous standard data of the target data dimension in the following manner:

obtaining a priority of each data source to be processed, and using a basic data source with a highest priority as a basis, searching whether all standard attribute fields of the target data dimension exist in the target standard attribute field under the basic data source;

determining the field data of the target standard attribute field under the basic data source as the multi-source heterogeneous standard data of the target data dimension when all standard attribute fields of the target data dimension exist in the target standard attribute field under the basic data source;

obtaining filled standard attribute fields that do not exist in all standard attribute fields of the target data dimension when at least part of the standard attribute fields of the target data dimension does not exist in the target standard attribute field under the basic data source;

obtaining field data to be filled after searching for at least one iteration cycle based on the filled standard attribute fields, and filling the field data to be filled into the basic data source, and combining to obtain the multi-source heterogeneous standard data of the target data dimension;

after each iteration cycle, searching for the target standard attribute field under the supplementary data source of next priority whether at least part of the standard attribute field obtained in a previous iteration cycle is filled in, when there are all filled standard attribute fields in the target standard attribute field under the supplementary data source of the iteration cycle, using the field data of the filled standard attribute fields under the supplementary data source of the iteration cycle as the field data to be filled, and ending the iteration cycle; and when there are only partially filled standard attribute fields in the target standard attribute field under the supplementary data source of the iteration cycle, using the field data of the partially filled standard attribute fields under the supplementary data source of the iteration cycle as the field data to be filled, and continuing to execute next iteration cycle; and when the filled target standard attribute fields do not exist in the target standard attribute field under the supplementary data source of the iteration cycle, continuing to execute the next iteration cycle, ending the iterative cycle, and obtaining the field data of all filled standard attribute fields as the field data to be filled after iteratively searching for the target standard attribute fields under all the data sources to be processed.

Figure 4:
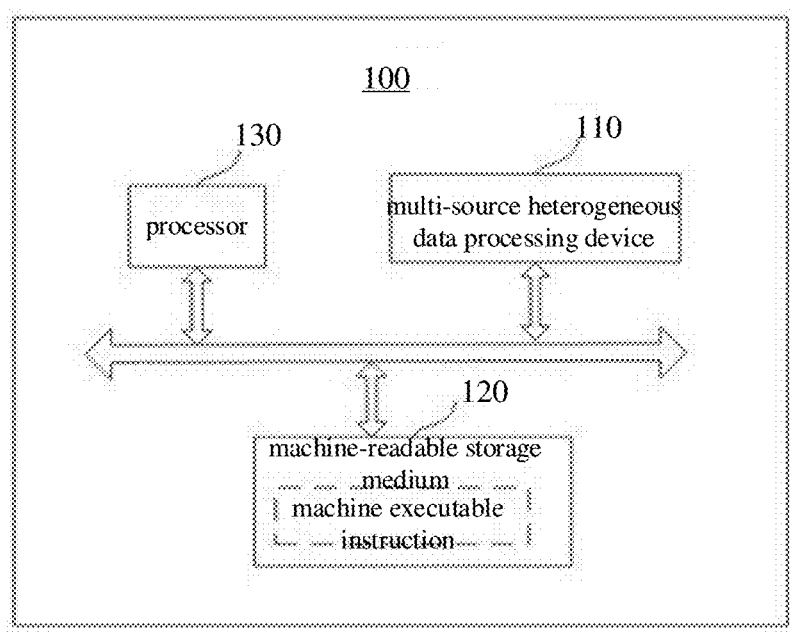
FIG. 4 shows a schematic structural diagram of components of a server for executing the above-mentioned multi-source heterogeneous data processing method according to an embodiment of the present disclosure.

Based on the same inventive concept, please refer to FIG. 4, which shows a structural schematic block diagram of a server 100 for executing the foregoing multi-source heterogeneous data processing method according to an embodiment of the present disclosure. The server 100 may include a multi-source heterogeneous data processing device 110, a machine-readable storage medium 120, and a processor 130.

In this embodiment, the machine-readable storage medium 120 and the processor 130 are both located in the server 100 and are provided separately. However, it should be understood that the machine-readable storage medium 120 may also be independent of the server 100, and may be accessed by the processor 130 through a bus interface. Alternatively, the machine-readable storage medium 120 may also be integrated into the processor 130, for example, may be a cache and/or a general register.

The multi-source heterogeneous data processing device 110 may include software function modules stored in a machine-readable storage medium 120 (for example, the acquisition module 111, the determination module 112, the conversion module 113, and the synthesis module 114 shown in FIG. 4). When the processor 130 executes the software function module in the multi-source heterogeneous data processing device 110, the multi-source heterogeneous data processing method provided in the foregoing method embodiment is implemented.

The above are only various implementation manners of the present disclosure, but the scope of the present disclosure is not limited thereto. Any person familiar with the technical field can easily think of changes or substitutions within the technical scope disclosed in the present disclosure, and they should be covered by the scope of the present disclosure. Therefore, the scope of the present disclosure shall be subject to the scope of the claims.

What is claimed is:

1. A method for processing multi-source heterogeneous data, applied to a server communicating with a user terminal, comprising the following operations:

obtaining multi-source heterogeneous data of a target data dimension, and determining a data source to be processed of the multi-source heterogeneous data and a field data of field to be converted corresponding to each data source to be processed;

determining a target standard attribute field of the field to be converted corresponding to each data source to be processed in the target data dimension from a pre-configured conversion field library, the pre-configured conversion field library including convertible fields corresponding to standard attribute fields of different data dimensions for each preset data source;

converting the field to be converted corresponding to each data source to be processed into a corresponding target standard attribute field to obtain the field data of the target standard attribute field corresponding to each data source to be processed; and synthesizing the multi-source heterogeneous standard data of the target data dimension according to the field data of the target standard attribute field corresponding to each data source to be processed, wherein the operation of synthesizing the multi-source heterogeneous standard data of the target data dimension according to the field data of the target standard attribute field corresponding to each data source to be processed includes:

performing a first deduplication process on the field data of the target standard attribute field corresponding to the data source to be processed according to a preset deduplication field corresponding to the target data dimension for each data source to be processed, to obtain the field data of the target standard attribute field after deduplication of the data source to be processed;

performing a second deduplication process on the field data of the target standard attribute field after deduplication of each data source to be processed, and combining the field data after the second deduplication process with the field data after the first deduplication process to obtain the multi-source heterogeneous standard data of the target data dimension;

wherein the operation of performing a first deduplication process on the field data of the target standard attribute field corresponding to the data source to be processed according to the preset deduplication field corresponding to the target data dimension to obtain the field data of the target standard attribute field after deduplication of the data source to be processed includes:

analyzing a data business meaning of the target data dimension, and determining a key business field of the target data dimension as the preset deduplication field corresponding to the target data dimension, when the target data dimension is a list data dimension;

searching for a target field data matching the preset deduplication field corresponding to the data source to be processed, and excluding all duplicate target field data, to obtain the field data of the target standard attribute field after deduplication of the data source to be processed;

when there are multiple key business fields in the target data dimension, and there are multiple empty target key business fields, obtaining supplementary deduplication fields corresponding to the empty target key business fields from a pre-configured supplementary field library, and using the supplementary deduplication fields and remaining key business fields as the preset deduplication field, the pre-configured supplementary field library including supplementary deduplication fields corresponding to each key business field;

wherein the operation of performing a second deduplication process on the field data of the target standard attribute field after deduplication of each data source to be processed, and combining the field data after the second deduplication process with the field data after the first deduplication process to obtain the multi-source heterogeneous standard data of the target data dimension includes:

obtaining a priority of each data source to be processed, and using a data source with a highest priority as a basis, searching whether all standard attribute fields of the target data dimension exist in the target standard attribute field corresponding to the data source;

determining the field data of the target standard attribute field corresponding to the data source as the multi-source heterogeneous standard data of the target data dimension when all standard attribute fields of the target data dimension exist in the target standard attribute field corresponding to the data source;

obtaining filled standard attribute fields that do not exist in all standard attribute fields of the target data dimension when at least part of the standard attribute fields of the target data dimension does not exist in the target standard attribute field corresponding to the data source;

obtaining field data to be filled after searching for at least one iteration cycle based on the filled standard attribute fields, and filling the field data to be filled into the data source to obtain the multi-source heterogeneous standard data of the target data dimension;

after each iteration cycle, determining whether the target standard attribute field corresponding to a supplementary data source of next priority includes partially filled standard attribute fields obtained in a previous iteration cycle when there are all filled standard attribute fields in the target standard attribute field corresponding to the supplementary data source of the iteration cycle, using the field data of the filled standard attribute fields corresponding to the supplementary data source of the iteration cycle as the field data to be filled, and ending the iteration cycle; and when there are only partially filled standard attribute fields in the target standard attribute field corresponding to the supplementary data source of the iteration cycle, using the field data of the partially filled standard attribute fields corresponding to the supplementary data source of the iteration cycle as the field data to be filled, and continuing to execute next iteration cycle; and when the filled target standard attribute fields do not exist in the target standard attribute field corresponding to the supplementary data source of the iteration cycle, ending the iteration cycle, and obtaining the field data of all filled standard attribute fields as the field data to be filled after iteratively searching for the target standard attribute fields corresponding to all the data sources to be processed.

2. The method of claim 1, further comprising the following operations:
configuring a convertible field of each preset data source corresponding to standard attribute fields of different data dimensions,
wherein the operation of configuring the convertible field of each preset data source corresponding to standard attribute fields of different data dimensions includes:
obtaining data dimensions to be standardized and data fields of different preset data sources corresponding to each data dimension to be standardized;
obtaining a valid field content corresponding to each data dimension to be standardized, and determining a standard attribute field corresponding to each data dimension to be standardized, and determining the convertible field of each preset data source corresponding to the standard attribute field according to a semantic analysis result of the standard attribute field; and
establishing the convertible field of each data source corresponding to the standard attribute fields corresponding to different data dimensions.

3. The method of claim 2, wherein the operation of determining the convertible field of each preset data source corresponding to the standard attribute field according to a semantic analysis result of the standard attribute field comprises:
obtaining the semantic analysis result of the standard attribute field, and searching for a matching field sequence in an online public database matching the semantic analysis result; and
determining the convertible field of each preset data source corresponding to the standard attribute field from a selection operation instruction for the matching field sequence.

4. The method of claim 1, wherein the operation of performing a first deduplication process on the field data of the target standard attribute field corresponding to the data source to be processed according to a preset deduplication field corresponding to the target data dimension for each data source to be processed, to obtain the field data of the target standard attribute field after deduplication of the data source to be processed comprises:
obtaining search key field of the target data dimension as the preset deduplication field corresponding to the target data dimension when the target data dimension is a single data dimension; and
searching for a target field data matching the preset deduplication field corresponding to the data source to be processed, and excluding all duplicate target field data, to obtain the field data of the target standard attribute field after deduplication of the data source to be processed.

5. A device for processing multi-source heterogeneous data, applied to a server communicating with a user terminal, comprising: software function modules stored in a non-transitory machine-readable storage medium and a processor, wherein when the software function modules are executed by the processor, the method for processing the multi-source heterogeneous data of claim 1 is performed.

* * * * *